April 28, 1931. T. BROWN 1,802,370
POWER OPERATED CULTIVATOR
Original Filed Feb. 10, 1928 2 Sheets-Sheet 1

WITNESS
Walter Ackerman

INVENTOR
Theophilus Brown,
BY Brown, Jackson, Boettcher & Diener
ATTORNEYS

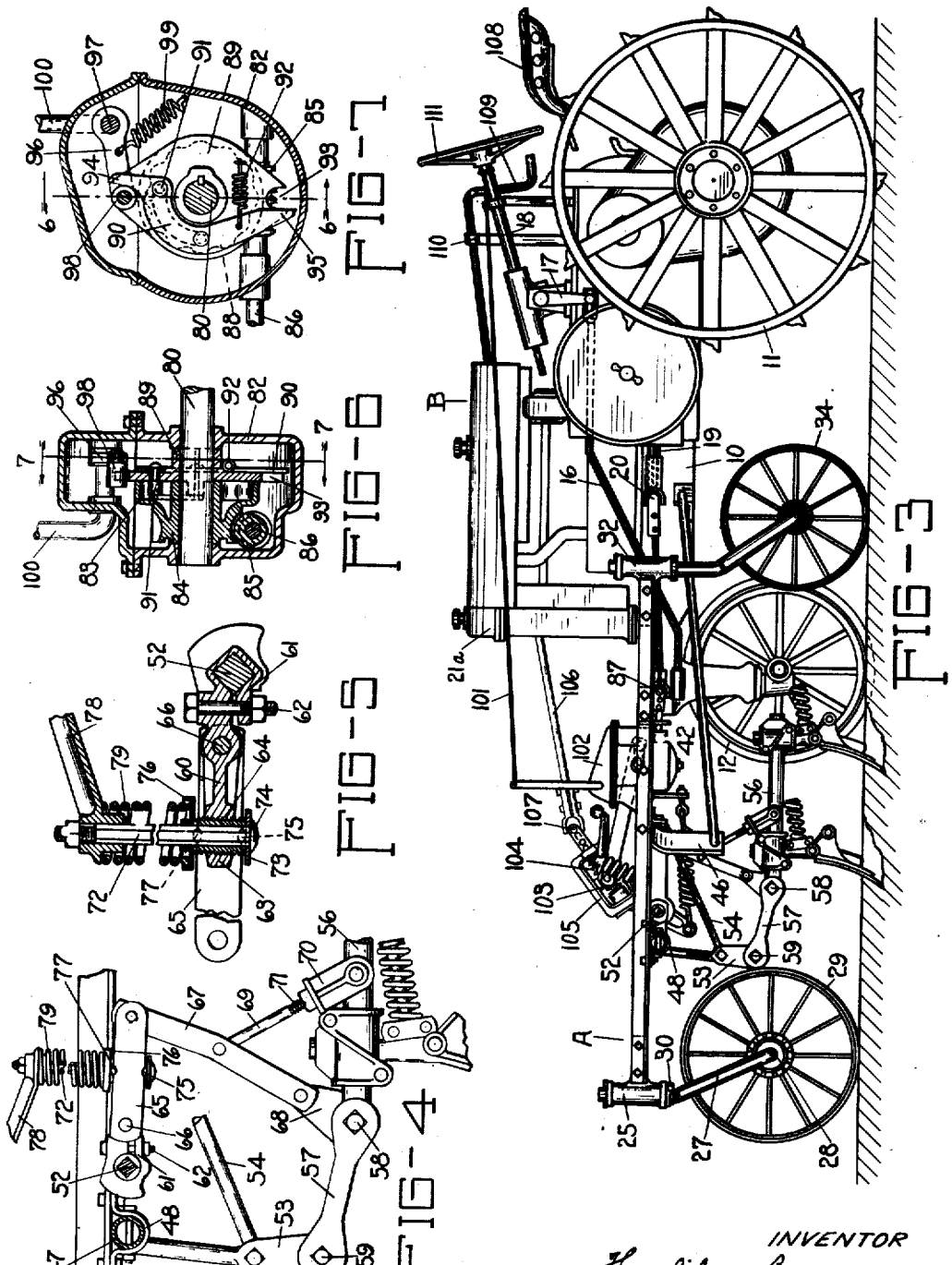

Patented Apr. 28, 1931

1,802,370

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

POWER OPERATED CULTIVATOR

Application filed February 10, 1928, Serial No. 253,315. Renewed September 22, 1930.

My invention has to do with tillage implements such as cultivators or analogous implements, and has particularly to do with their propulsion and operation by mechanical power. The development of efficient farm tractors has been followed by the application thereto in various ways of a variety of devices for performing the different operations required in farming, including cultivation of the soil between plant rows, but so far as I am aware, prior to my present invention no entirely satisfactory means has been devised for utilizing a farm tractor for soil tillage purposes.

A farm tractor is an expensive machine, and, therefore, for economical reasons it is necessary that it be available for use not only in the usual farming operations, but also for other purposes, such as operating ensilage cutters, corn shellers, and other machines commonly used on or about farms, that are capable of being operated by power; also different farming operations require the use of different implements so that it is frequently necessary to substitute one attachment for another on the tractor, which makes it necessary that tillage implements be so designed that they may be readily applied to or removed from the tractor, while still retaining the characteristic features that make them perform satisfactorily the work for which they are intended.

Considering particularly the cultivation of the soil, as is well known to those familiar with the art, the horse drawn cultivator generally in use comprises a wheel supported frame adapted to straddle one or more rows of plants and equipped with shovel carrying rigs that till the soil between the rows and throw it toward the plants as the machine travels along the rows. The rows extending one way across the field are usually approximately straight so that there is comparatively little occasion for dodging plants that may be out of line by lateral deflection of the path followed by the cultivator rigs, but in cross cultivation the rows are not apt to be so straight, and, therefore, the operator frequently has occasion to move the rigs laterally to avoid damaging plants that are out of line. Obviously, therefore, it is necessary that the operator have a clear view of the rows and of the rigs so that he may properly guide the cultivator. Furthermore, owing to inequalities of the ground there is more or less tilting of the cultivator in one direction or another, and provision must be made for proper operation of the cultivating devices notwithstanding such tilting movements. Also, it is necessary to provide means for raising and lowering the rigs as occasion may require.

Heretofore it has been proposed to provide a power operated cultivator by making the cultivating devices in the form of an attachment adapted to be applied to the front portion of the frame of a tractor so as to form a unitary machine, the cultivating rigs being attached to an auxiliary frame structure secured to and supported by the front portion of the tractor frame. This arrangement is unsatisfactory for various reasons, and particularly because it necessitates placing the cultivator rigs so that their shovels are back of the front wheels of the tractor, to avoid their being unfavorably affected by the oscillating movement of the tractor frame due to running over uneven ground. Obviously, if the rigs are located at or near the transverse vertical plane of the front tractor wheels they will rise and fall with the latter wheels, causing uneven cultivation, and this is accentuated if the rigs are connected with the tractor frame at points forward of such plane. Locating the rigs back of the front tractor wheels is objectionable because it interferes with their visibility, making it more difficult for the operator to follow the rows and dodge plants. Another objection to making the cultivating apparatus in the form of an attachment to be secured to and supported by the tractor frame is that the application to or removal of such attachment from the tractor frame requires the expenditure of considerable time and effort, and after the attachment has been removed it is quite cumbersome and difficult to handle, either for putting it in storage or replacing it on the tractor.

It has also been proposed to attach a cultivator comprising a frame and dirigible wheels to the front of a tractor, and using the dirigible wheels of the cultivator for steering the tractor as well as the cultivator. This also is objectionable because it necessitates placing the rigs back of the steering wheels, and as the combined machine is very sluggish in steering it cannot be swung to one side or the other quickly to dodge plants. In such machines, therefore, it is practically necessary to mount the rigs so that they may be swung laterally in unison with the turning of the wheels in steering. In this type of machine, as well as in the one first referred to, the cultivator part of the machine is not stably supported on the ground, and consequently when the parts are disconnected the cultivator part is difficult to handle.

I have discovered that the objections to prior constructions can be avoided, and certain important advantages obtained by making the cultivator as a separate unit having a stable support of its own on the ground, so that it maintains its normal position regardless of whether it be connected with the tractor or not, and providing means by which the cultivator or tillage unit can readily be connected with or disconnected from a power unit, such as a farm tractor, in front thereof, in such manner as to be propelled thereby, and to derive power therefrom for raising or lowering the rigs. Furthermore, such connections should be such as to hold the tillage unit against lateral swinging with respect to the power unit, so that by mounting the tillage unit on ground supports, such as caster wheels, of such character as to permit it to respond to lateral deflection of the tractor frame in steering, the tillage unit will be guided by the tractor, and, due to its location in advance of the steering wheels of the tractor, it may be shifted quickly to one side or the other to dodge plants without its being necessary to turn the steering wheels to any great extent. The course of the tractor, therefore, may be kept practically straight along the rows, notwithstanding the shifting of the rigs to dodge plants. One of the important advantages of this arrangement is that it provides for locating the cultivator rigs ahead of the front wheels of the tractor so that they are plainly visible to the operator and can be guided accurately by him. Furthermore, by supporting the tillage unit stably on its own front and rear wheels, the rigs may be located at points between such wheels, where they are least affected by tilting of such unit, and as the tractor may conform to inequalities of the ground independently of the tillage unit, the position of the rigs is not disturbed by rocking or tilting movements of the tractor.

To provide for raising and lowering the rigs suitable power operated mechanism, preferably of the type comprising the well-known half revolution clutch, is mounted on the frame of the tillage unit and is flexibly connected with a driving element on the power unit so that notwithstanding relative movement of the two units the driving connections are not disturbed. When the two units are disconnected the tillage unit maintains its normal position on its ground engaging supports, which, as has been stated, are preferably in the form of caster wheels, so that it may be readily moved away for storage until it is again required for use, when it may easily be moved into place in front of the tractor to be again connected with it. The connections required are simple and can easily be made by one person. After the removal of the tillage unit the tractor is at once ready for any other use to which it may be desired to put it.

Having now given a brief general description of the nature of my invention I shall proceed to a detailed description of the embodiment thereof illustrated in the accompanying drawings, which it should be understood is only one of a variety of ways in which such invention may be incorporated in an operative machine or implement. It should be understood also that the term "cultivator" as used in this specification and in the appended claims is employed in a generic sense to comprehend not only tillage implements of the type commonly known as cultivators, but also all other implements of like general character to which my improvements may be applicable.

In the accompanying drawings,—

Fig. 3 is a side elevation of the complete implement showing the rigs in their operative position;

Fig. 4 is a detail showing the devices for connecting the rigs with the frame of the tillage or cultivator unit;

Fig. 5 is a partial longitudinal vertical sectional view illustrating the preferred arrangement for vertically adjusting the rigs independently of each other;

Fig. 6 is a vertical cross-section on line 6—6 of Fig. 7, showing the clutch mechanism that forms part of the power actuated means for raising and lowering the rigs; and Fig. 7 is a vertical section on line 7—7 of Fig. 6.

Figure 1:
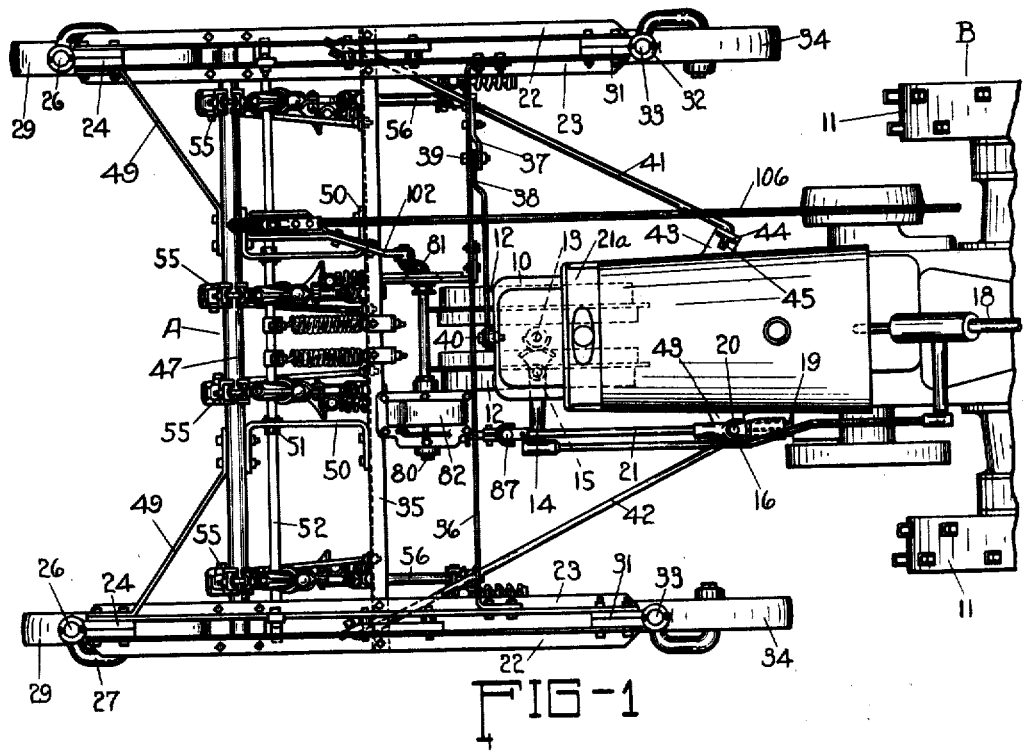
Fig. 1 is a plan view showing the two units constituting my improved implement assembled in operative relation to each other, the rear portion of the tractor being broken away.

Referring to the drawings, in which the cultivator unit as an entirety is indicated by A, and the power unit or tractor as an entirety is indicated by B, 10 indicates the tractor frame which is supported at the rear on propelling wheels 11 and at the front on one or more steering wheels 12. The tractor shown is of the three-wheeled or tricycle type, that is to say, it is provided with two propelling wheels at the rear and with a single centrally located steering element at the front which in the present instance is shown as comprising two small wheels set close together at opposite sides of the longitudinal center line of the tractor and arranged to be turned for steering purposes by a common steering connection. If desired, however, a single steering wheel could be used. In the arrangement shown there is a vertical steering spindle 13 arranged to be turned by means of an arm 14 pivoted at 15 to the frame of the tractor, and adapted to be swung back and forth by a steering rod 16 which at its rear end is connected with a crank 17. Said crank is swung back and forth about a transverse axis by the usual worm gearing operated by rotation of a steering post 18 which is preferably provided with the usual hand wheel. The illustration is intended to represent a conventional form of steering means, as my invention is not concerned with the particular devices used for that purpose. I have shown a tractor of the tricycle type because the cultivator unit illustrated is intended for two-row cultivation, in which case the front wheel or wheels of the tractor travel in the space between the two rows being cultivated, while the propelling wheels would travel in the spaces between such rows and the adjoining rows at opposite sides thereof. My invention may, however, also be applied to machines designed for cultivating three or more rows, and obviously in such cases a tractor of appropriate design having dirigible front wheels would be employed.

It is believed to be unnecessary to describe the construction of the tractor in detail, as it may be of any approved design provided with power take-off connections so that power may be furnished for operating the power lift mechanism. It will suffice to say that in the illustrated construction 19 indicates a power take-off shaft which is connected with the power plant of the tractor so that it is rotated thereby. The forward end of this shaft is square and it is adapted to fit telescopically in a square socket carried by a universal joint 20 by which it is operatively connected with a power shaft 21, best shown in Fig. 1. This shaft extends forward and is adapted to be connected with the power lift mechanism on the cultivator unit, as will be more fully hereinafter described. The usual radiator 21ª is provided at the front of the tractor, and the usual internal combustion motor is mounted on the tractor frame back of the radiator. The motor is not shown as it may be of any approved type.

The cultivator unit A comprises a frame which is supported upon four caster wheels mounted respectively upon the front and rear end portions of the side members of the frame. In the illustrated construction each of such side members is composed of two parallel angle irons 22, 23 disposed oppositely to each other, and spaced a short distance apart. Between the front ends of each pair of angle irons 22, 23 is secured a bracket 24 in the form of a casting provided with a vertical sleeve 25 which forms a bearing for the spindle portion 26 of a caster wheel support, the intermediate portion 27 of which is offset laterally, while its lower end portion 28 is bent horizontally to form a journal for a caster wheel 29. A collar 30 on each caster wheel support below the sleeve 25 holds such sleeve up in its proper position. The offset portion 27 of each caster wheel support is to provide clearance for the wheel, and such offset portions are inclined rearwardly so that the caster wheels trail back of the spindles 26 as the machine progresses and readily swing to one side or the other in response to lateral movements of the cultivator frame. Between the rear ends of each pair of angle irons 22 and 23 are secured brackets 31, similar to the brackets 24, and provided with sleeves 32 that form bearings for the spindle portions 33 of the caster wheel supports that carry rear caster wheels 34. The mounting of these caster wheels is substantially the same as that of the front caster wheels, and, therefore, need not be described in detail. I prefer, however, to make the front caster wheels somewhat larger in diameter than the rear caster wheels because when the machine is in operation most of the strain is transmitted to the front part of the cultivator frame and such strains are better sustained by the larger wheels.

The two side members of the cultivator frame are cross-connected by a transverse angle bar 35 which is located preferably about midway between the ends of said side members, as best shown in Fig. 1, and also the angle irons 23 at opposite sides of the machine are connected by a cross-bar 36, preferably in the form of a flat bar having its ends bent at right angles and bolted or riveted to the vertical flanges of the angle irons 23. Near one end of the bar 23 it is provided with a strap 37 offset at its inner end to form a yoke which receives the outer end portion of a radius bar 38 which is pivotally connected with the bar 36 and strap 37 by a bolt 39, as shown in Fig. 1. The radius bar 38 extends inwardly from the pivot 39 to the longitudinal center line of the machine where it is connected by a pivot 40 with the front portion of the tractor frame 10. The radius bar, therefore, constitutes a vertically swinging link connection between the center of the tractor unit and a side portion of the cultivator unit, which permits the cultivator frame to swing vertically about a longitudinal axis near one side or the other of said frame, independently of and without affecting the tractor unit. Manifestly, by the construction described, if the caster wheels at one side of the cultivator frame run over an elevation on the ground, or drop into a trench or hole, that side may rise or fall without raising or lowering the opposite side of the cultivator frame and without affecting the tractor. The same is true of the other side of the cultivator frame. Also, any lateral tilting of the tractor frame is not communicated to the cultivator frame, and as the pivotal connections at 39 and 40 are made somewhat loose the tractor and cultivator frames may tilt about transverse axes to a limited extent without affecting each other. The radius bar 38 serves also to aid in holding the cultivator frame against shifting laterally with respect to the tractor frame. This feature of providing transversely extending means, such as a radius bar or equivalent device, to hold the tillage unit against lateral swinging with respect to the power unit, and also permit the tillage unit to rock about a longitudinal axis at one side or the other of the longitudinal center of the power unit is, as I believe, generically new, and is not limited in its application to a tillage unit that is stably supported on the ground, but may be advantageously employed in any other situation to which it is adapted.

Figure 2:
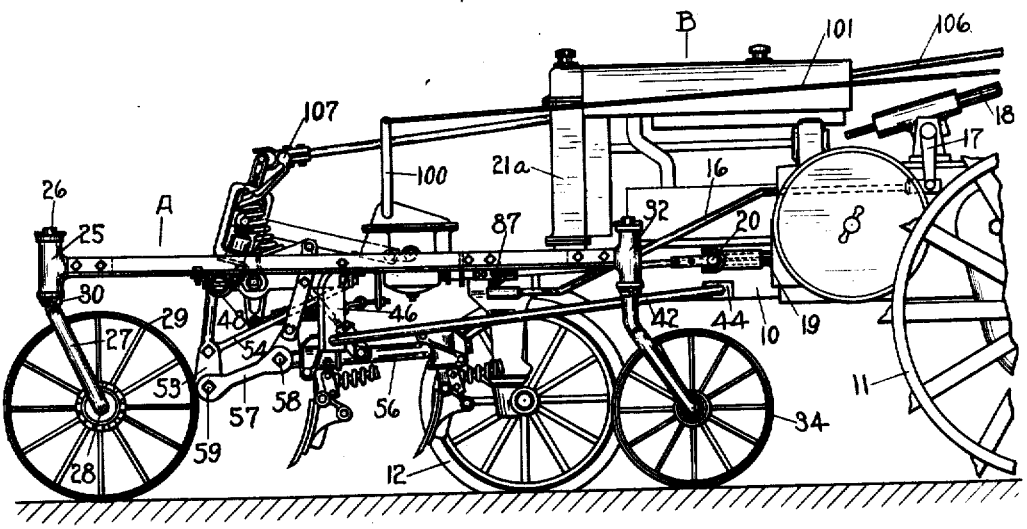
Fig. 2 is a side elevation of the parts shown in Fig. 1, the rigs being shown in their inoperative or raised position.

The cultivator unit is intended to be propelled by the tractor unit, and to this end push rods 41, 42 are provided at opposite sides of the tractor frame, which bars diverge forwardly and are pivotally connected to the opposite side portions of the cultivator frame. As illustrated in Fig. 1, the tractor frame is provided at its opposite sides with lugs 43 having upturned ends 44 which are engaged by the bent rear ends 45 of the push bars 41, 42, thus forming pivotal connections that permit vertical swinging of the push rods. The forward ends of the push rods 41, 42 are also bent at right angles and engage pivotally in holes in the lower end portions of downwardly extending bars 46 secured to the side members of the cultivator frame, as best shown in Fig. 2. The pivotal connections of the forward ends of the push rods are substantially in line with the front connections of the rigs hereinafter described so that the pushing force applied to the cultivator unit through the push rods is transmitted to it to the best advantage. As these push rods are capable of swinging up and down they accommodate themselves to tilting movements of the cultivator unit, and in connection with the radius rod 38, they serve to hold it against lateral swinging with reference to the tractor or power unit. Obviously, to connect the cultivator unit to the power unit it is necessary only to put the pivot 40 in place, connect the rear ends of the push rods 41, 42 to the tractor frame, and connect the power shaft 21 with the power take-off 19. When the cultivator unit is removed it leaves the tractor clear for any other use to which it may be desired to put it, and as the cultivator unit when disconnected from the tractor is stably supported on its own wheels it may easily be pushed away to a place of storage. Likewise, when it is to be connected to the tractor, it may without difficulty be run up into the proper position with reference to the tractor.

From the foregoing description it will be apparent that the cultivator unit is guided altogether by the steering of the tractor through its steering wheel or wheels 12, and that as it extends a considerable distance forward of such steering wheels any lateral deflection of the front portion of the tractor frame will effect a greater lateral deflection of the front portion of the cultivator unit, to which, as will be hereinafter described, the cultivator rigs are connected. Also, inasmuch as the cultivator rigs are located ahead of the tractor the operator has a clear view of them at all times. Consequently, without difficulty he may guide the rigs very accurately to dodge plants that are out of line or to follow irregular rows.

For attaching the soil tilling rigs to the cultivator frame I provide a transversely disposed tubular rod 47, the opposite ends of which are secured to the side members of the cultivator frame, preferably by clips 48, as shown in Figs. 2 and 4. The end portions of this rod are braced to the forward end portions of the side members of the cultivator frame by braces 49, as shown in Fig. 1. They are also braced to the cross-bar 35 by U-shaped braces 50. The latter braces are provided near their forward ends with bearings 51 in which is journaled a rock-shaft 52 that extends transversely of the cultivator frame, and by the rocking of which, as will be hereinafter described, the cultivator rigs are raised or lowered in unison. The transverse rod 47 is provided at properly spaced intervals with four depending hangers 53, with the lower ends of which the forward ends of the cultivator rigs are connected, as will be hereinafter described. These hangers are braced by brace rods 54 that extend rearward and upward and at their rear ends are connected with the transverse bar 35. The hangers 53 are thus held against swinging fore and aft. Preferably the several hangers 53 are adjustably connected with the rod 47 so that their position thereon may be shifted longitudinally of said rod to vary the position and spacing of the rigs, and for this purpose said hangers are connected with the rod 47 by clamps 55, best shown in Fig. 1. When said hangers are shifted in this manner the brace rods 54 are also shifted lengthwise of the cross-bar 35, for which purpose said cross-bar may be provided with a series of spaced holes to receive the rear ends of said braces.

Since the cultivator shown in the drawings is intended for two-row cultivation, it is equipped with four cultivator rigs 56 which are pivotally connected at their forward ends with the hangers 53 to swing vertically but not laterally, by means of draft links 57 pivoted at 58 to the rigs and at 59 to the hangers, as shown in Figs. 2 and 4. The several rigs are connected with the rock shaft 52 so that they may be raised or lowered in unison by rocking said shaft, and the connections for that purpose preferably include means by which the several rigs may be adjusted vertically independently of each other, as will now be described, but it should be understood that the construction shown is not claimed herein as it constitutes the subject-matter of a separate application for patent.

As shown in Figs. 4 and 5, each of such connections comprises an arm 60 non-rotatably secured to the rock shaft, preferably by a clamp 61 tightened by a bolt 62. The shaft 52 is preferably square in cross-section, and it is obvious that the arms 60 may be adjusted longitudinally of said shaft and will be swung vertically by the rocking thereof. Each of said arms projects rearwardly from the shaft and is provided with a screw-threaded head 63 in which works a threaded sleeve 64, best shown in Fig. 5, the purpose of which will be presently explained. Each arm 60 is provided with a pair of parallel lift bars 65, one at each side thereof, and pivotally connected thereto by pivots 66 adjacent to the rock shaft 52, so that said bars may be swung vertically to vary their angular relation to the arms 60. The rear ends of each pair of bars 65 are connected with a cultivator rig 56 by means of a depending link 67, the lower end of which is pivotally connected with a lug 68 at the forward end of the rig, while the intermediate portion of said link is connected with an intermediate portion of the rig by a rod 69 and yoke 70 with which said rod is adjustably connected by threads 71. By this construction vertical swinging of the lift bars 65 will raise or lower the rig with which they are connected, and it will be apparent that by angularly adjusting the lift bars 65 with reference to the arm 60 with which they are associated the rig may be vertically adjusted without rocking the rock shaft 52. In order that the lift bars 65 may be actuated by the shaft 52 it is necessary to hold said bars normally in fixed relation to the arm 60, and for this purpose I provide a bolt 72 which extends upwardly through the sleeve 64 and is keyed thereto so that by rotating said bolt the sleeve may be rotated. A washer 73 is placed on the lower end of the bolt 72 between its head 74 and the lower end of the sleeve 64, which washer overlies the lower margins of the lift bars 65, and engage portions 75 that project from such margins and form rocker bearings for the washer on said lift bars. A cup-shaped washer 76 is placed on the bolt 72 above the upper end of the sleeve 64, which washer also engages rocker bearings 77 that project from the upper margins of the lift bars 65, as shown in Fig. 5. Secured upon the upper end of the bolt 72 is a crank 78, by means of which the bolt 72 may be rotated, and between said crank and the cup washer 76 is a spring 79 which through the cup washer 76 exerts downward pressure on the lift bars 65. By this construction the lift bars 65 are held against downward swinging about the pivot 66, but may swing upward against the tension of the spring 79 to permit the rig to spring upward should its shovels encounter some root or other obstacle, but as soon as the obstacle has been passed the rig will drop back to its normal position with the lift bars 65 resting on the washer 73. This upward movement of the lift bars is, of course, independent of the arm 60 with which it is associated. To separately adjust a given rig the bolt 72 is rotated by means of the crank 78 to adjust the sleeve 64 and the arm 60, thereby changing the angular relation of the lift bars 65 to said arm, which raises or lowers the rear ends of said lift bars and consequently raises or lowers the rig without rocking the rock-shaft 52. By rocking said shaft, however, the lift bars 65 of the several rigs may be swung upward or downward, thereby raising or lowering the rigs in unison.

The rock shaft 52 is rocked to raise or lower the rigs in unison by power operated mechanism mounted on the cultivator unit and actuated by power from the tractor unit, such power operated mechanism being similar in general design to those shown in my pending applications, Serial Nos. 126,122, filed July 31, 1926, and 128,929, filed August 13, 1926, although the construction shown differs somewhat in detail therefrom. So far as my present invention is concerned, any suitable power lift mechanism of the type referred to may be employed, but I prefer to use the mechanism shown. Such power lift mechanism comprises a transversely disposed shaft 80 having a crank 81 at one end thereof, as shown in Fig. 1. This shaft is mounted on the cultivator unit and its end opposite the crank 81 extends into a clutch housing 82 preferably supported by the transverse bars 35, 36 as shown in Fig. 1. Within this housing is a clutch member 83 having connected thereto or formed integral therewith a worm wheel 84 journaled on the shaft 80 so that it and the clutch member 83 may normally rotate independently of the shaft. The worm wheel 84 is engaged by a worm 85 carried by a shaft 86 that extends fore and aft and is connected at its rear end by a universal joint 87 with the forward end of the power shaft 21. By this arrangement, since the power shaft 21 is constantly driven when the motor is in operation, the clutch member 83 will also be constantly driven. Such clutch member is of the type having internal corrugations 88 around its margin, such as are commonly used in connection with power lift plows, and is adapted to cooperate with a clutch member 89 keyed on the shaft 80 and provided with a rocking arm 90 having a roller 91 adapted to be moved into or out of engagement with the corrugations 88 by the rocking of said arm. A spring 92 tends normally to hold the roller 91 in engagement with said corrugations as usual. The clutch member 89 is provided with concave recesses 93 in its margin at diametrically opposite points, and the arm 90 is provided with projecting ends 94, 95 that extend out beyond and adjacent to said recesses, as shown in Fig. 7. A swinging trip arm 96 carried by a shaft 97 is provided with a roller 98 adapted to enter the recesses 93 under the influence of a spring 99, also shown in Fig. 7. The arrangement is such that when the roller 98 enters one of the recesses 93 it will engage one or the other of the ends 94, 95 of the arm 90 and rock said arm against the tension of the spring 92 to move its roller 91 out of engagement with the corrugations 98, thereby disconnecting the two clutch members. By rocking the shaft 97 to swing the arm 96 upward out of the recess 93 the arm 90 will be released and the roller 91 be moved into engagement with one of the corrugations 88 consequent upon the movement of the arm 90 effected by the spring 92. Whenever the trip arm 96 is actuated to connect the clutch members its roller 98 will ride around on the outer margin of the clutch member 89 until such clutch member has made a half revolution, when said roller will drop into the opposite recess 93 and disengage the clutch members. Obviously, when the clutch members are connected, since the clutch member 89 is keyed on the shaft 80, said shaft and the crank 81 will be given a half revolution and will then stop until the trip arm 96 is again actuated. The shaft 97 is rocked to actuate the trip arm 96 through an upwardly projecting arm 100 carried by said shaft, which arm has a rearwardly extending rod 101 that extends to a point convenient to the operator's seat. Thus the operator by actuating the arm 100 may at any time connect the clutch members to effect the rotation of the shaft 80 and crank 81.

The crank 81 is operatively connected with the rock shaft 52 by connections that include means for adjusting the extent to which said rock shaft is rocked upon each half revolution of the shaft 80, which connections, however, are not herein claimed as they constitute the subject-matter of a separate application. Briefly explained, they comprise a pitman 102 connected at its rear end with the crank 81 and at its forward end with a screw-threaded collar 103 that travels on a screw-threaded shaft 104 mounted in a bracket 105 that is non-rotatably mounted on the shaft 52. Manifestly by adjusting the position of the collar 103 toward or from the rock shaft 52 the extent to which said rock shaft is rocked by the operation of the crank 81 may be varied. The collar 103 is non-rotatably supported, and it is adjusted along the screw 104 by rotating said screw, which may be accomplished from the driver's seat by means of a rod 106 connected at its forward end with the upper end of said screw by a universal coupling 107. Said rod extends back to a point near the driver's seat 108 where it is provided with a crank 109 by which it may be rotated. The rear portion of said rod is supported by a bracket 110 shown in Fig. 3. The usual steering wheel by which the front wheels of the tractor are steered is shown at 111 in Fig. 3.

It will be noted that the power lift mechanism is supported on the cultivator unit, but by reason of the flexible connections provided by the universal joints 20 and 87 which connect it with the source of power on the tractor unit, the driving connections are not affected by rocking or tilting of the cultivator unit with reference to the tractor. Also, when the cultivator unit is disconnected from the tractor the power lift mechanism remains with it, the driving connections being disconnected at either end of the shaft 21, which is preferably telescopically connected with the power take-off shaft 19 of the tractor or with the worm shaft 86 of the power lift mechanism.

When the two units are operatively connected as described the cultivator unit, although separately supported stably on the ground, is held against lateral swinging with reference to the power unit and is guided by the steering of the latter unit by means of the steering wheel or wheels thereof. Furthermore, each unit is free to rock or rise and fall independently of the other, and either side of the cultivator unit may rise or fall due to irregularities in the ground without raising or lowering the other side. As has been pointed out, the connection of the rigs to a ground supported cultivator unit located in advance of the power or propelling unit not only locates them where they can at all times be seen clearly by the operator, and where they respond readily to the lateral deflection of the course of the propelling unit in steering it, but also removes them from the influence of rising, falling or rocking movement of the power unit so that their proper operation is not disturbed thereby. So far as I am aware an implement having these characteristics is broadly new in the art, and the claims hereinafter made are therefore to be generically construed. While I have shown and described the cultivator unit as comprising a frame supported upon four caster wheels, since I prefer such arrangement, three caster wheels or other equivalent supports capable of permitting lateral movement of the cultivator unit in response to steering changes of the propelling unit could be used, in which case the ground engaging members should be arranged to support the cultivator frame stably independently of its connection with the propelling unit.

What I claim as my invention and desire to secure by Letters Patent, is—

1. A farm implement comprising a power unit including a frame supported on propelling and steering wheels, a tillage unit including a frame stably supported on the ground independently of the power unit in advance thereof and provided with tillage devices, and means detachably connecting said units together and serving to hold the tillage unit against lateral swinging with respect to the power unit, whereby the tillage unit is guided by the steering of the power unit.

2. A farm implement comprising a power unit including a frame supported on propelling and steering wheels, a tillage unit including a frame stably supported in advance of the power unit on caster wheels and provided with tillage devices, and means detachably connecting said units together and serving to hold the tillage unit against lateral swinging with respect to the power unit, whereby the tillage unit is guided by the steering of the power unit.

3. A farm implement comprising a power unit including a frame supported on propelling and steering wheels, a tillage unit including a frame stably supported on the ground independently of the power unit in advance thereof and provided with tillage devices, and means connecting said units together to permit the tillage unit to rise and fall relatively to the power unit, and meanwhile holding the tillage unit against lateral swinging with respect to the power unit, whereby the tillage unit is guided by the steering of the power unit.

4. A farm implement comprising a power unit including a frame supported on propelling and steering wheels, a tillage unit including a frame stably supported on the ground independently of the power unit in advance thereof and provided with tillage devices, and means connecting said units together to permit the tillage unit to rock with respect to the power unit about a longitudinal axis, and meanwhile holding the tillage unit against lateral swinging with respect to the power unit, whereby the tillage unit is guided by the steering of the power unit.

5. A farm implement comprising a power unit including a frame supported on propelling and steering wheels, a tillage unit including a frame stably supported on the ground independently of the power unit in advance thereof and provided with tillage devices, and means connecting said units together to cause the tillage unit to be pushed by the power unit while permitting rocking thereof about a longitudinal axis at one side or the other of the longitudinal center line of the power unit, and for holding the tillage unit against lateral swinging with respect to the power unit, whereby the tillage unit is guided by the steering of the power unit.

6. A farm implement comprising a power unit including a frame supported on propelling and steering wheels, a tillage unit including a frame stably supported in advance of the power unit on caster wheels and provided with tillage devices, and means connecting said units together to permit the tillage unit to rise and fall relatively to the power unit, and meanwhile holding the tillage unit against lateral swinging with respect to the power unit, whereby the tillage unit is guided by the steering of the power unit.

7. A farm implement comprising a power unit including a frame supported on propelling and steering wheels, a tillage unit including a frame stably supported on caster wheels independently of the power unit in advance thereof and provided with tillage devices, and means connecting said units together to cause the tillage unit to be pushed by the power unit while permitting rocking thereof about a longitudinal axis at one side or the other of the longitudinal center line of the power unit, and means for holding the tillage unit against lateral swinging with respect to the power unit, whereby the tillage unit is guided by the steering of the power unit.

8. A farm implement comprising a power unit including a frame supported on propelling and steering wheels, a tillage unit including a frame stably supported on the ground independently of the power unit and in advance thereof, to be pushed thereby, tillage devices connected with the latter frame and engaging the soil in advance of the steering axis of the steering wheel, and means detachably connecting said units together to permit relative working thereof, and serving to hold the tillage unit against lateral swinging with respect to the power unit, whereby the tillage unit is guided by the steering of the power unit.

9. A farm implement comprising a power unit including a frame supported on propelling and steering wheels, a tillage unit including a frame stably supported on caster wheels independently of the power unit and, in advance thereof, to be pushed thereby, tillage devices connected with the latter frame and engaging the soil in advance of the steering axis of the steering wheel, and means detachably connecting said units together to permit relative rocking thereof, and serving to hold the tillage unit against lateral swinging with respect to the power unit, whereby the tillage unit is guided by the steering of the power unit.

10. A farm implement comprising a power unit including a frame supported on propelling and steering wheels, a tillage unit including a frame stably supported on the ground independently of the power unit and in advance thereof, to be pushed thereby, tillage devices connected with the latter frame and engaging the soil in advance of the steering axis of the steering wheel, and means connecting said units together to permit the tillage unit to rise and fall with respect to the power unit, and serving to hold the tillage unit against lateral swinging with respect to the power unit, whereby the tillage unit is guided by the steering of the power unit.

11. A farm implement comprising a power unit including a frame supported on propelling and steering wheels, a tillage unit including a frame stably supported on caster wheels independently of the power unit and, in advance thereof, to be pushed thereby, tillage devices connected with the latter frame and engaging the soil in advance of the steering axis of the steering wheel, and means connecting said units together to permit the tillage unit to rise and fall with respect to the power unit, and serving to hold the tillage unit against lateral swinging with respect to the power unit, whereby the tillage unit is guided by the steering of the power unit.

12. A farm implement comprising a power unit including a frame supported on propelling and steering wheels, a tillage unit including a frame stably supported on front and rear caster wheels independently of the power unit and in advance thereof, to be pushed thereby, tillage devices connected with the latter frame and engaging the soil between the front and rear caster wheels, and means connecting said units together to permit the tillage unit to rock about transverse and longitudinal axes with respect to the power unit, and serving to hold the tillage unit against lateral swinging with respect to the power unit, whereby the tillage unit is guided by the steering of the power unit.

13. A farm implement comprising a power unit including a frame supported on propelling and steering wheels, a tillage unit including a frame stably supported on the ground independently of the power unit and in advance thereof, to be pushed thereby and provided with vertically movable tillage devices, means detachably connecting said units together to permit relative rocking thereof, and serving to hold the tillage unit against lateral swinging with respect to the power unit, whereby the tillage unit is guided by the steering of the power unit, power lift mechanism including lifting means for the tillage devices mounted on the frame of the tillage unit, and means operatively and detachably connecting said power lift mechanism with a source of power on the power unit.

14. A farm implement comprising a power unit including a frame supported on propelling and steering wheels, a tillage unit including a frame stably supported on the ground, in advance of the power unit to be pushed thereby, vertically movable tillage devices connected with the latter frame, means connecting said units together to permit the tillage unit to rock about transverse and longitudinal axes relatively to the power unit, and serving to hold the tillage unit against lateral swinging with respect to the power unit, whereby the tillage unit is guided by the steering of the power unit, power lift mechanism, including lifting means for the tillage devices mounted on the frame of the tillage unit, and flexible means connecting said power lift mechanism with a source of power on the power unit for operating said power lift mechanism therefrom.

15. A farm implement comprising a power unit including a frame supported on propelling and steering wheels, a tillage unit including a frame stably supported on the ground independently of the power unit in advance thereof, and provided with tillage devices, and means detachably connecting said units together meanwhile holding the tillage unit against lateral swinging with respect to the power unit but permitting the tillage unit to rock with respect to the power unit, comprising a vertically swinging member pivotally connected with the power unit and with a side portion of the frame of the tillage unit.

16. A farm implement comprising a power unit including a frame supported on propelling and steering wheels, a tillage unit including a frame stably supported in advance of the power unit on front and rear caster wheels, and provided with tillage devices, and means detachably connecting said units together meanwhile holding the tillage unit against lateral swinging with respect to the power unit but permitting the tillage unit to rock with respect to the power unit, comprising a vertically swinging member pivotally connected with the power unit and with a side portion of the frame of the tillage unit.

17. A farm implement comprising a power unit including a frame supported on propelling and steering wheels, a tillage unit including a frame stably supported in advance of the power unit on front and rear caster wheels, and provided with tillage devices, means detachably connecting said units together meanwhile holding the tillage unit against lateral swinging with respect to the power unit but permitting the tillage unit to rock with respect to the power unit, comprising a vertically swinging member pivotally connected with the power unit and with a side portion of the frame of the tillage unit, and forwardly diverging push rods pivotally connected with the power unit and with opposite side portions of the tillage unit to swing vertically.

18. A cultivator unit comprising a frame stably supported on the ground, tillage devices connected with said frame to move vertically, means mounted on said frame by power from a propelling unit to raise and lower the tillage devices, and means for detachably connecting said cultivator unit in advance of a propelling and steering unit, to push said cultivator unit and hold the same against lateral swinging with respect to the propelling and steering unit and meanwhile permit the cultivator unit to rock relatively thereto about longitudinal transverse axes.

19. A cultivator unit comprising a frame stably supported on the ground, tillage devices connected with said frame to move vertically, means mounted on said frame operable by power from a propelling unit to raise and lower the tillage devices, and means for detachably connecting said cultivator unit in advance of a propelling and steering unit, to push said cultivator unit and hold the same against lateral swinging with respect to the propelling and steering unit and meanwhile permit the cultivator unit to rock relatively thereto about a longitudinal axis at either side of the cultivator unit.

20. A cultivator unit comprising a frame stably supported on the ground, tillage devices connected with said frame to move vertically, means mounted on said frame operable to raise and lower the tillage devices, and means for detachably connecting said cultivator unit in advance of a propelling and steering unit to push said cultivator unit and hold the same against lateral swinging with respect to the propelling and steering unit and meanwhile permit the cultivator unit to rock relatively thereto vertically and about a longitudinal axis at either side of the cultivator unit, comprising a vertically swinging member pivotally connected with the cultivator unit at one side thereof and adapted to be pivotally connected with the propelling and steering unit, and vertically swinging push rods adapted to connect the opposite sides of the cultivator unit with the propelling and steering unit.

21. A farm implement comprising a power unit including a frame supported on propelling and steering wheels, a tillage unit including a frame supported on the ground in advance of the power unit and propelled thereby, tillage devices connected with the latter frame, and transversely extending means constituting a pivotal connection between said units that serves to hold the tillage unit against lateral swinging with respect to the power unit, whereby the tillage unit is guided by the steering of the power unit.

22. A farm implement comprising a power unit including a frame supported on propelling and steering wheels, a tillage unit arranged to be propelled thereby, including a frame having wheels engaging the ground in advance of the power unit, and provided with tillage devices, and a transverse link pivotally connecting said units and serving to hold the tillage unit against lateral swinging with respect to the power unit, whereby the tillage unit is guided by the steering of the power unit.

23. A farm implement comprising a power unit including a frame supported on propelling and steering wheels, a tillage unit arranged to be propelled thereby, including a frame having supporting means engaging the ground in advance of the power unit, and provided with tillage devices, and transversely extending means pivotally connecting said units together to permit the tillage unit to rise and fall relatively to the power unit, and serving also to hold the tillage unit against lateral swinging with respect to the power unit, whereby the tillage unit is guided by the steering of the power unit.

24. A farm implement comprising a power unit including a frame supported on propelling and steering wheels, a tillage unit arranged to be propelled thereby, including a frame having supporting means engaging the ground in advance of the power unit, and provided with tillage devices, and transversely extending means pivotally connecting said units together to permit the tillage unit to rock with respect to the power unit about a longitudinal axis, and serving also to hold the tillage unit against lateral swinging with respect to the power unit, whereby the tillage unit is guided by the steering of the power unit.

25. A farm implement comprising a power unit including a frame supported on propelling and steering wheels, a tillage unit arranged to be propelled thereby, including a frame having supporting means engaging the ground in advance of the power unit, and provided with tillage devices, and means serving to hold the tillage unit against lateral swinging with respect to the power unit, whereby the tillage unit is guided by the steering of the power unit, said means comprising a transverse link pivotally connected at its ends to the power unit and the tillage unit, respectively.

26. A farm implement comprising a power unit including a frame supported on propelling and steering wheels, a tillage unit arranged to be propelled thereby, including a frame having supporting means engaging the ground in advance of the power unit, and provided with tillage devices, and a vertically swinging transverse link pivotally connected with said units to permit the tillage unit to rock about a longitudinal axis at one side or the other of the longitudinal center line of the power unit, and also to hold the tillage unit against lateral swinging with respect to the power unit, whereby the tillage unit is guided by the steering of the power unit.

THEOPHILUS BROWN.

pelling and steering wheels, a tillage unit arranged to be propelled thereby, including a frame having supporting means engaging the ground in advance of the power unit, and provided with tillage devices, and a vertically swinging transverse link pivotally connected with said units to permit the tillage unit to rock about a longitudinal axis at one side or the other of the longitudinal center line of the power unit, and also to hold the tillage unit against lateral swinging with respect to the power unit, whereby the tillage unit is guided by the steering of the power unit.

THEOPHILUS BROWN.

CERTIFICATE OF CORRECTION.

Patent No. 1,802,370.            Granted April 28, 1931, to

THEOPHILUS BROWN.

It is hereby certified that error appears in the printed specification of the above numbered patent requiring correction as follows: Page 7, line 122, claim 8, for the word "working" read rocking; page 8, line 80, claim 14, strike out the comma after "ground"; page 9, line 25, claim 18, after the word "longitudinal" insert the word and; and that the said Letters Patent should be read with these corrections therein that the same may conform to the record of the case in the Patent Office.

Signed and sealed this 4th day of August, A. D. 1931.

(Seal)

Wm. A. Kinnan,
Acting Commissioner of Patents.

CERTIFICATE OF CORRECTION.

Patent No. 1,802,370.  Granted April 28, 1931, to

THEOPHILUS BROWN.

It is hereby certified that error appears in the printed specification of the above numbered patent requiring correction as follows: Page 7, line 122, claim 8, for the word "working" read rocking; page 8, line 80, claim 14, strike out the comma after "ground"; page 9, line 25, claim 18, after the word "longitudinal" insert the word and; and that the said Letters Patent should be read with these corrections therein that the same may conform to the record of the case in the Patent Office.

Signed and sealed this 4th day of August, A. D. 1931.

(Seal)

Wm. A. Kinnan,
Acting Commissioner of Patents.